US012259676B2

(12) United States Patent
Sato et al.

(10) Patent No.: US 12,259,676 B2
(45) Date of Patent: Mar. 25, 2025

(54) TRANSPORT DEVICE AND RECORDING DEVICE

(71) Applicant: SEIKO EPSON CORPORATION, Tokyo (JP)

(72) Inventors: Koji Sato, Shiojiri (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 194 days.

(21) Appl. No.: 17/654,611

(22) Filed: Mar. 14, 2022

(65) Prior Publication Data

US 2022/0291621 A1 Sep. 15, 2022

(30) Foreign Application Priority Data

Mar. 15, 2021 (JP) ................................ 2021-041066

(51) Int. Cl.
*G03G 21/00* (2006.01)
*B41J 29/17* (2006.01)

(52) U.S. Cl.
CPC .......... *G03G 21/0005* (2013.01); *B41J 29/17* (2013.01); *B65H 2301/531* (2013.01)

(58) Field of Classification Search
CPC ..... G03G 21/0005; B41J 29/17; B41J 11/007; B65H 2301/531; B65H 2601/2611; B65H 5/021; B65G 45/22; B65G 43/00; B65B 39/073; F26B 21/004
See application file for complete search history.

(56) References Cited

U.S. PATENT DOCUMENTS

2005/0168515 A1* 8/2005 Nagai .................... B41J 3/4078 347/23
2012/0121307 A1* 5/2012 Shiiya .................. G03G 15/161 399/348
2012/0201563 A1* 8/2012 Miyazawa ......... G03G 15/0291 399/92

(Continued)

FOREIGN PATENT DOCUMENTS

CN 200939743 8/2007
CN 200939743 Y * 8/2007

(Continued)

*Primary Examiner* — Gene O Crawford
*Assistant Examiner* — Abby A Jorgensen
(74) *Attorney, Agent, or Firm* — WORKMAN NYDEGGER

(57) ABSTRACT

A transport device includes a transport belt having a support surface configured to support a medium, a cleaning roller including an absorbent member configured to absorb cleaning liquid, and configured to clean the support surface as the absorbent member comes into contact with the support surface, a supply unit configured to supply the cleaning liquid to the cleaning roller, and a squeeze member to squeeze the absorbent member as the cleaning roller rotates in a state in which the squeeze member is in contact with the absorbent member. The supply unit is configured to be switched between a supply state in which the cleaning liquid is supplied to the cleaning roller and a non-supply state in which the cleaning liquid is not supplied to the cleaning roller, and the squeeze member squeezes the absorbent member while the supply unit is in the non-supply state.

7 Claims, 5 Drawing Sheets

(56) References Cited

U.S. PATENT DOCUMENTS

| | | | | |
|---|---|---|---|---|
| 2012/0251147 | A1* | 10/2012 | Gomi | G03G 15/105 399/58 |
| 2012/0263500 | A1* | 10/2012 | Saka | G03G 15/167 399/177 |
| 2014/0253622 | A1* | 9/2014 | Momose | B65H 5/021 347/101 |
| 2018/0099512 | A1* | 4/2018 | Amari | B41J 13/025 |

FOREIGN PATENT DOCUMENTS

| | | | | | |
|---|---|---|---|---|---|
| EP | 1918115 | A2 | * | 5/2008 | B41J 11/007 |
| EP | 3403838 | | | 11/2018 | |
| EP | 3403838 | A1 | * | 11/2018 | B41J 11/007 |
| EP | 3868563 | A1 | * | 8/2021 | B41J 11/0005 |
| JP | 2004-137034 | A | | 5/2004 | |
| JP | 2005-280942 | | | 10/2005 | |
| JP | 2005280942 | A | * | 10/2005 | |
| KR | 20090124464 | A | * | 12/2009 | |
| WO | WO-2012073905 | A1 | * | 6/2012 | B41J 11/007 |
| WO | WO-2012073907 | A1 | * | 6/2012 | B41J 11/007 |
| WO | WO-2015049868 | A1 | * | 4/2015 | B08B 1/006 |

* cited by examiner

TRANSPORT DEVICE AND RECORDING DEVICE

The present application is based on, and claims priority from JP Application Serial Number 2021-041066, filed Mar. 15, 2021, the disclosure of which is hereby incorporated by reference herein in its entirety.

BACKGROUND

1. Technical Field

The present disclosure relates to a transport device and a recording device.

2. Related Art

JP-A-2004-137034 describes a transport device including a transport belt for transporting a medium and a cleaning roller for cleaning the transport belt. Cleaning liquid is supplied to the cleaning roller. The cleaning roller cleans the transport belt with the cleaning liquid by contacting the transport belt.

In such a transport device, when the cleaning roller remains wet with the cleaning liquid, the cleaning roller may deteriorate.

SUMMARY

A transport device for solving the above-described issue includes a transport belt having a support surface configured to support a medium, and configured to transport the medium supported by the support surface, a cleaning roller including an absorbent member configured to absorb cleaning liquid, and configured to clean the support surface as the absorbent member comes into contact with the support surface, a supply unit configured to supply the cleaning liquid to the cleaning roller, a drive unit configured to rotate the cleaning roller, and a squeeze member configured to contact the absorbent member and to squeeze the absorbent member as the cleaning roller rotates in a state in which the squeeze member is in contact with the absorbent member, the supply unit is configured to be switched between a supply state in which the cleaning liquid is supplied to the cleaning roller and a non-supply state in which the cleaning liquid is not supplied to the cleaning roller, and the squeeze member squeezes the absorbent member while the supply unit is in the non-supply state.

A recording device for solving the above-described issue includes a recording unit configured to perform recording on a medium, a transport belt having a support surface configured to support the medium, and configured to transport the medium supported by the support surface, a cleaning roller including an absorbent member configured to absorb cleaning liquid, and configured to clean the support surface as the absorbent member comes into contact with the support surface, a supply unit configured to supply the cleaning liquid to the cleaning roller, a drive unit configured to rotate the cleaning roller, and a squeeze member configured to contact the absorbent member and to squeeze the absorbent member as the cleaning roller rotates in a state in which the squeeze member is in contact with the absorbent member, the supply unit is configured to be switched between a supply state in which the cleaning liquid is supplied to the cleaning roller and a non-supply state in which the cleaning liquid is not supplied to the cleaning roller, and the squeeze member squeezes the absorbent member when the supply unit is in the non-supply state.

DESCRIPTION OF EXEMPLARY EMBODIMENTS

One exemplary embodiment of a recording device including a transport device will be described below with reference to the accompanying drawings. The recording device is, for example, an ink jet-type printer that records an image such as characters and photographs on a medium such as a sheet and fiber by discharging ink, which is an example of a recording material. The recording device is not limited to ink-jet type, may be a toner-jet type, or may perform recording using other recording methods.

Figure 1:
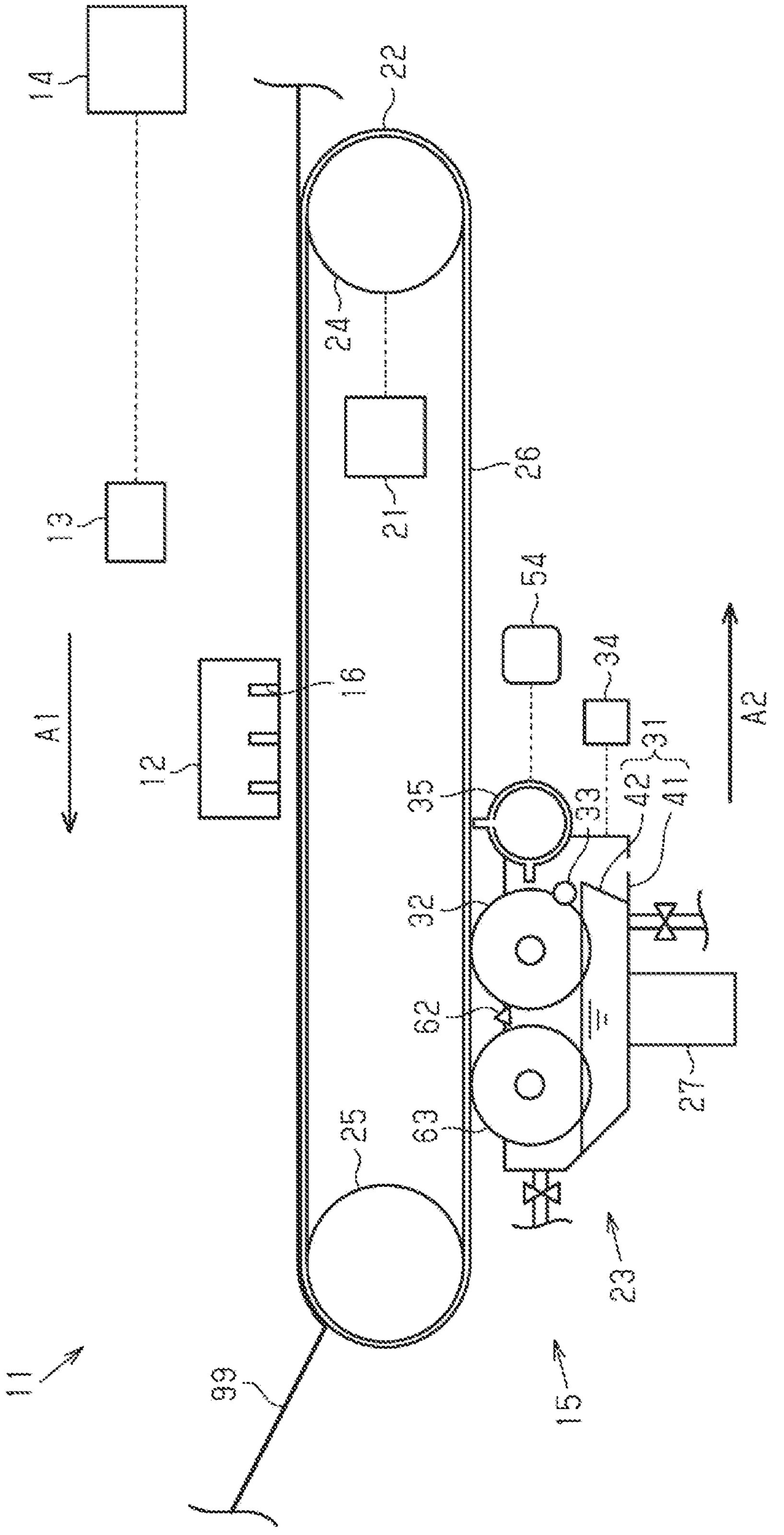
FIG. 1 is a side view illustrating an embodiment of a recording device including a transport device.

As illustrated in FIG. 1, a recording device 11 includes a recording unit 12, a control unit 13, a reception unit 14, and a transport device 15.

The recording unit 12 is configured to perform recording on a medium 99. The recording unit 12 is, for example, a head. Therefore, the recording unit 12 of this embodiment includes one or a plurality of nozzles 16. In this embodiment, the recording unit 12 is a serial head that performs scanning with respect to the medium 99. The recording unit 12 may be a line head that performs recording all at once over the width of the medium 99. The recording unit 12 records an image on the medium 99 by discharging liquid onto the medium 99.

The control unit 13 controls the recording device 11. The control unit 13 controls, for example, the recording unit 12, the transport device 15, and the like. The control unit 13 can be configured as a circuit including a: one or more processors that execute various processes according to a computer program, one or more dedicated hardware such as an integrated circuit for a specific application that executes at least a part of the various processes, and y: a combination thereof. The processor includes a CPU and a memory such as a RAM and a ROM, and the memory is configured to store a program code or a command configured to cause the CPU to execute the processing. The memory, or a computer readable medium includes any readable medium accessible by a general purpose or special purpose computer.

The reception unit 14 is configured to receive instructions from a user. The reception unit 14 is, for example, an operating panel. The reception unit 14 is coupled to the control unit 13. The user's instruction received by the reception unit 14 is input to the control unit 13. As will be described later, the reception unit 14 can receive instructions from the user regarding operation of a squeeze member 33 squeezing an absorbent member 52. The reception unit 14 can display various information related to the recording device 11.

The transport device 15 is a device configured to transport the medium 99. In this embodiment, the transport device 15 intermittently transports the medium 99. The transport device 15 may continuously transport the medium 99.

The transport device 15 includes a plurality of rollers, a drive source 21, a transport belt 22, and a cleaning mechanism 23. The transport device 15 may include a control unit that controls the transport device 15 in addition to the control unit 13 included in the recording device 11. In this case, for example, the control unit 13 included in the recording device 11 and the control unit included in the transport device 15 communicate with each other. Instead of the control unit 13, the transport device 15 may include the control unit. In this case, for example, the control unit included in the transport device 15 controls the recording unit 12. When the transport device 15 includes the control unit, the reception unit 14 may be coupled to the control unit. For example, the transport device 15 may include the reception unit 14.

The transport device 15 of this embodiment includes, for example, a first roller 24 and a second roller 25 as the plurality of rollers. The first roller 24 and the second roller 25 transport the medium 99 in a first direction A1. The first direction A1 is a direction in which the medium 99 is transported. The first roller 24 and the second roller 25 are arranged in this order in the first direction A1. Therefore, the first roller 24 is located upstream of the recording unit 12 in the first direction A1. The second roller 25 is located downstream of the recording unit 12 in the first direction A1.

The drive source 21 is, for example, a motor that rotates the plurality of rollers. The drive source 21 is coupled to the first roller 24, the second roller 25, or both, for example. In this embodiment, the drive source 21 is coupled to the first roller 24. Therefore, the drive source 21 rotates the first roller 24. In this embodiment, the transport belt 22 rotates the second roller 25 as the first roller 24 rotates.

The transport belt 22 is wound around the plurality of rollers. In this embodiment, the transport belt 22 is wound around the first roller 24 and the second roller 25. When the drive source 21 rotates the first roller 24, the transport belt 22 moves along the first roller 24 and the second roller 25, that is, circulates. As a result, the transport belt 22 transports the medium 99. In this embodiment, the transport belt 22 transports the medium 99 by moving intermittently. The transport belt 22 circulates in a counterclockwise direction in FIG. 1, for example.

The transport belt 22 has a support surface 26 that supports the medium 99. The support surface 26 is an outer peripheral surface of the transport belt 22.

The transport belt 22 is a belt to which an adhesive is applied, for example. The adhesive is applied to the support surface 26. The medium 99 is adhered to the support surface 26 by the adhesive. As a result, posture of the medium 99 is stabilized. The medium 99 may be adhered to the support surface 26 by, for example, attractive force, electrostatic force, intermolecular force, or the like, not limited to the adhesive. An image is recorded by the recording unit 12 on the medium 99 supported on the support surface 26.

The transport belt 22 may become dirty by transporting the medium 99. In particular, the support surface 26 easily becomes dirty. For example, powder and fluff generated from the medium 99, dust in the air, recording material by the recording unit 12, and the like may adhere to the support surface 26. As a result, the support surface 26 becomes dirty. When the support surface 26 becomes dirty, dirt may stick to the medium 99. Further, when the support surface 26 becomes dirty, adhesive force of the support surface 26 to the medium 99 may be impaired.

Figure 2:
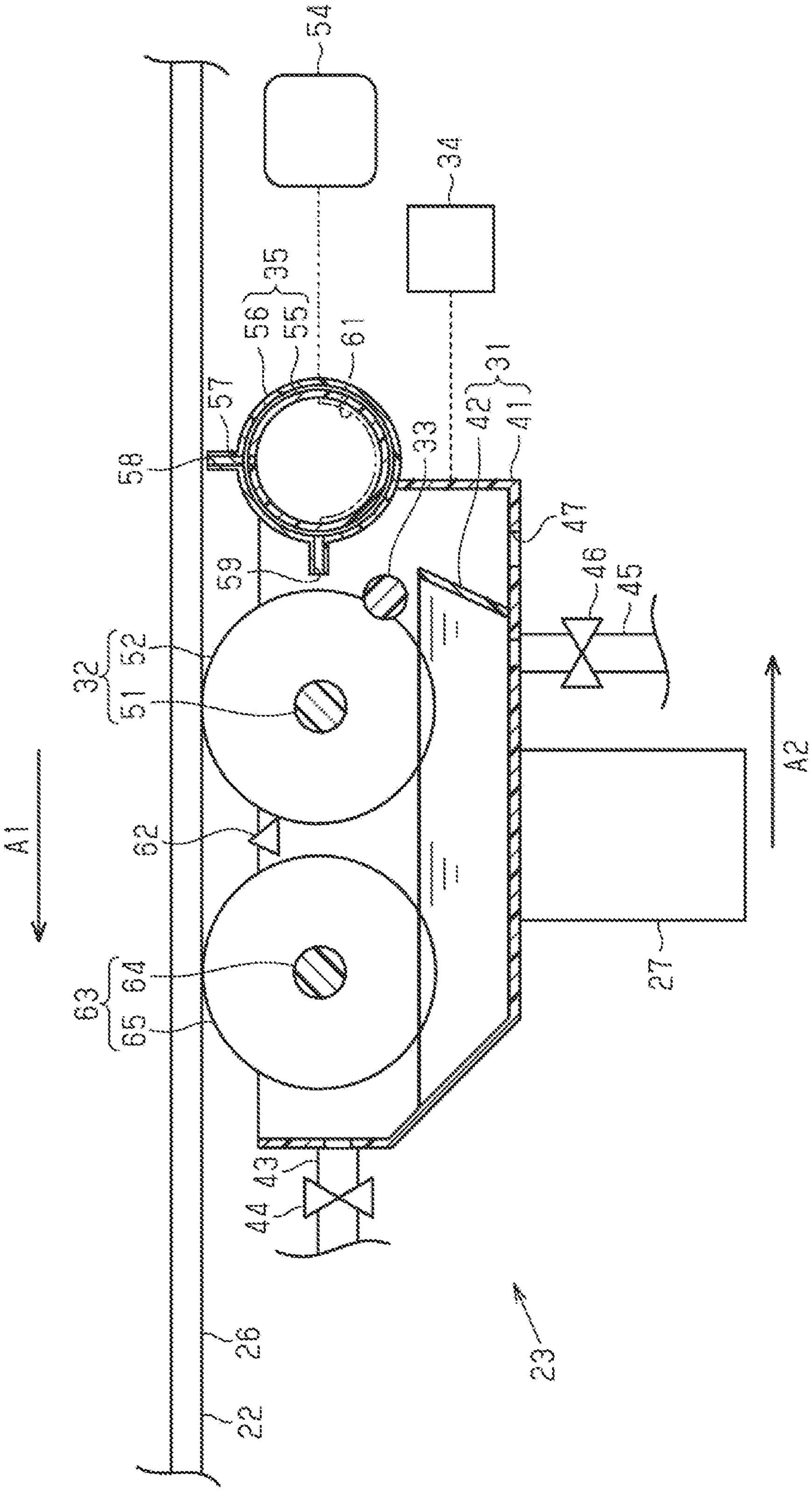
FIG. 2 is a side view illustrating a cleaning mechanism in a supply state and in a contact state.

As illustrated in FIGS. 1 and 2, the cleaning mechanism 23 is a mechanism for cleaning the transport belt 22. Specifically, the cleaning mechanism 23 cleans the support surface 26 by contacting the support surface 26. This reduces possibility of dirt adhering to the medium 99 from the transport belt 22. Further, adhesive force of the support surface 26 is prevented from being decreased.

The cleaning mechanism 23 is located so as to contact the support surface 26 in a region through which the medium 99 does not pass. The region through which the medium 99 does not pass is, for example, a region facing a portion of the support surface 26 that moves in a second direction A2. The second direction A2 is a direction opposite the first direction A1. On the other hand, a region through which the medium 99 passes is, for example, a region facing a portion of the support surface 26 that moves in the first direction A1. Therefore, the cleaning mechanism 23 is located so as to contact the portion of the support surface 26 that moves in the second direction A2, for example. Therefore, in this embodiment, the cleaning mechanism 23 and the recording unit 12 are located so as to sandwich the transport belt 22, for example. Specifically, the cleaning mechanism 23 and the recording unit 12 are located so as to sandwich the transport belt 22 vertically. As a result, the cleaning mechanism 23 cleans the support surface 26 on which the medium 99 has been supported, that is, the support surface 26 on which the medium 99 has been peeled off. The support surface 26 after being cleaned supports again the medium 99 by circulating.

The cleaning mechanism 23 is controlled by the control unit 13, for example. When the transport device 15 includes the control unit, the cleaning mechanism 23 may be controlled by the control unit. A detailed description of the cleaning mechanism 23 will be described later.

The transport device 15 may include a movement mechanism 27. The movement mechanism 27 relatively moves the transport belt 22 and the cleaning roller 32 such that a cleaning roller 32 included in the cleaning mechanism 23 is separated from the support surface 26. The cleaning roller 32 will be described later. In this embodiment, the movement mechanism 27 separates the cleaning roller 32 from the support surface 26 by moving the cleaning mechanism 23 with respect to the transport belt 22. The movement mechanism 27 of this embodiment raises and lowers the cleaning mechanism 23 with respect to the transport belt 22. The movement mechanism 27 may move the transport belt 22 relative to the cleaning mechanism 23 or may move both the transport belt 22 and the cleaning mechanism 23. Further, the movement mechanism 27 may move the cleaning roller 32 independently instead of the entire cleaning mechanism 23.

Next, the cleaning mechanism 23 will be described.

Figure 3:
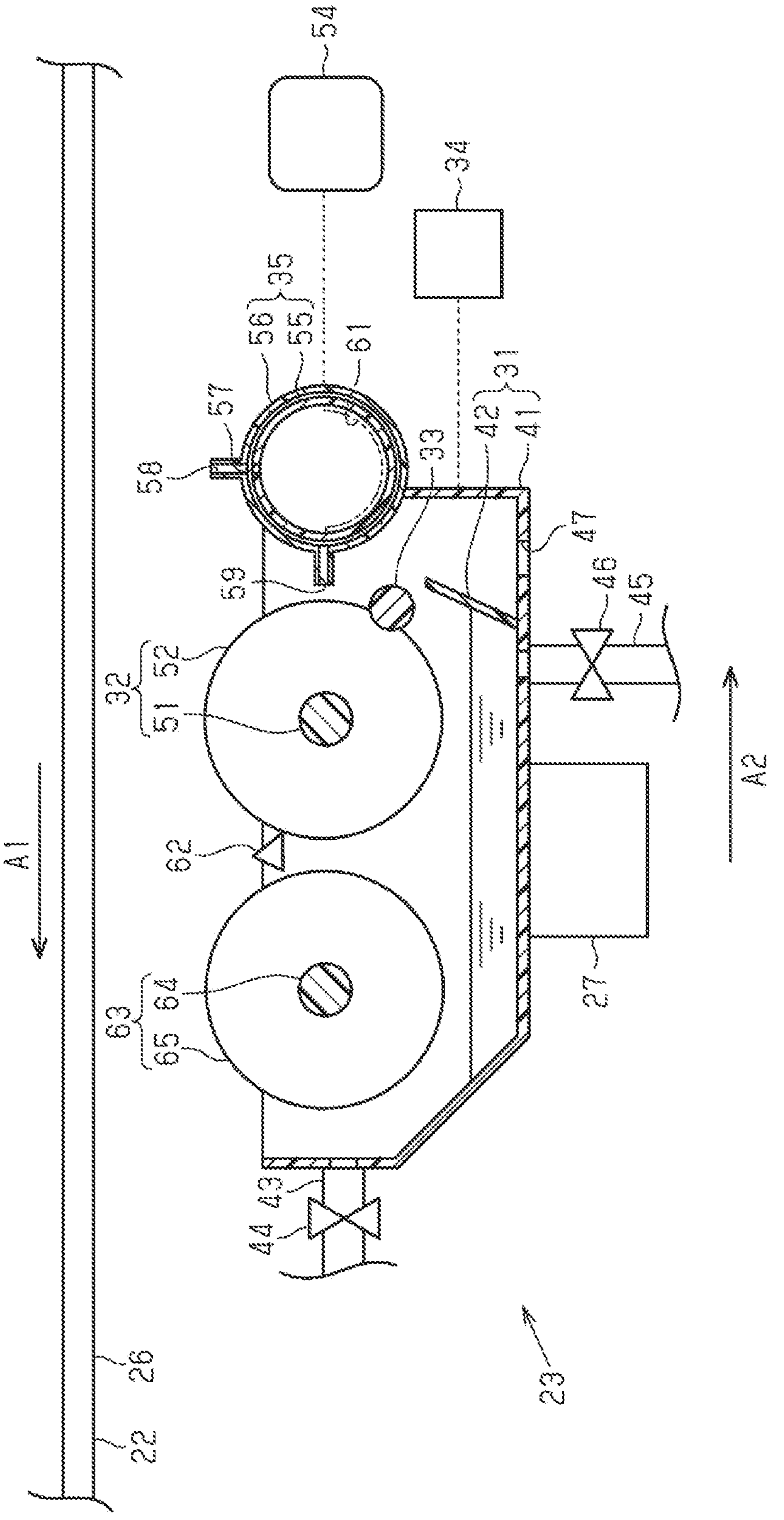
FIG. 3 is a side view illustrating the cleaning mechanism in a non-supply state and in a non-contact state.

As illustrated in FIGS. 2 and 3, in this embodiment, the cleaning mechanism 23 includes a supply unit 31, the cleaning roller 32, the squeeze member 33, a drive unit 34, and a spray unit 35.

The supply unit 31 is configured to supply cleaning liquid to the cleaning roller 32. The cleaning liquid is, for example, water. Note that the cleaning liquid may be another liquid. The supply unit 31 includes, for example, a support tank 41, a storage tank 42, a supply pipe 43, a supply valve 44, a discharge pipe 45, and a discharge valve 46.

The support tank 41 accommodates the storage tank 42. In this embodiment, the cleaning roller 32, the squeeze member 33, and the spray unit 35 are attached to the support tank 41. The support tank 41 includes a discharge port 47. The discharge port 47 is located on a bottom surface of the support tank 41, for example. The discharge port 47 is an opening for discharging the cleaning liquid that has flowed out from the storage tank 42 to the support tank 41.

The storage tank 42 stores the cleaning liquid. The storage tank 42 of this embodiment accommodates a portion of the cleaning roller 32. Specifically, the storage tank 42 accommodates a lower end portion of the cleaning roller 32. Therefore, the cleaning roller 32 is immersed in the cleaning liquid as the storage tank 42 stores the cleaning liquid. In this way, the cleaning liquid is supplied to the cleaning roller 32. The storage tank 42 is located, for example, on the bottom surface of the support tank 41. By accommodating the storage tank 42 in the support tank 41, the cleaning liquid stored in the storage tank 42 is prevented from scattering around the supply unit 31.

The supply pipe 43 is coupled to a supply source of the cleaning liquid and the support tank 41. The supply source of the cleaning liquid is, for example, a tap. The cleaning liquid is supplied to the storage tank 42 by flowing the cleaning liquid from the supply source through the supply pipe 43. By flowing into the support tank 41 and then falling, the cleaning liquid is stored in the storage tank 42. The supply pipe 43 may be coupled to the storage tank 42.

The supply valve 44 is provided at the supply pipe 43. When the supply valve 44 is opened, the cleaning liquid is supplied to the storage tank 42 through the supply pipe 43. When the supply valve 44 is closed, supply of the cleaning liquid to the storage tank 42 stops.

The discharge pipe 45 is coupled to the storage tank 42. As the cleaning liquid flows from the storage tank 42 to the discharge pipe 45, the cleaning liquid is discharged from the storage tank 42.

The discharge valve 46 is provided at the discharge pipe 45. When the discharge valve 46 is opened, the cleaning liquid is discharged from the storage tank 42 through the discharge pipe 45. When the discharge valve 46 is closed, discharge of the cleaning liquid from the storage tank 42 stops.

The supply unit 31 is configured to be switched between a supply state in which the cleaning liquid is supplied to the cleaning roller 32 and a non-supply state in which the cleaning liquid is not supplied to the cleaning roller 32. In this embodiment, the supply state is a state in which the cleaning roller 32 contacts the liquid stored in the storage tank 42. In this embodiment, the non-supply state is a state in which the cleaning roller 32 does not contact the liquid stored in the storage tank 42.

In this embodiment, a state of the supply unit 31 is switched between the supply state and the non-supply state as liquid level of the cleaning liquid stored in the storage tank 42 changes. For example, as the control unit 13 controls the supply valve 44 and the discharge valve 46, the liquid level of the cleaning liquid stored in the storage tank 42 changes. For example, when the control unit 13 controls the supply valve 44 and the discharge valve 46 such that opening degree of the supply valve 44 is larger than opening degree of the discharge valve 46, the liquid level of the cleaning liquid increases. In this case, when the control unit 13 controls the supply valve 44 and the discharge valve 46 such that opening degree of the supply valve 44 is smaller than opening degree of the discharge valve 46, the liquid level of the cleaning liquid decreases.

In this embodiment, when the supply unit 31 is in the supply state, the liquid level of the cleaning liquid stored in the storage tank 42 is height at which the cleaning roller 32 is immersed in the cleaning liquid. When the supply unit 31 is in the non-supply state, the liquid level of the cleaning liquid stored in the storage tank 42 is height at which the cleaning roller 32 is not immersed in the cleaning liquid. The state of the supply unit 31 may be switched not only by changing the liquid level of the cleaning liquid stored in the storage tank 42, but also by, for example, relative movement of the cleaning roller 32 and the storage tank 42.

The cleaning roller 23 cleans the support surface 26 by contacting the support surface 26. The cleaning roller 32 is rotatably supported by the support tank 41.

The cleaning roller 32 includes a rotary shaft 51 and the absorbent member 52. The rotary shaft 51 is, for example, parallel to a shaft of the first roller 24 and a shaft of the second roller 25. The absorbent member 52 is a member capable of absorbing the cleaning liquid. The absorbent member 52 is, for example, a sponge. The absorbent member 52 is supported by the rotary shaft 51. The absorbent member 52 rotates with the rotary shaft 51. As the absorbent member 52 contacts the support surface 26, the support surface 26 is cleaned.

In this embodiment, a portion of the absorbent member 52 is accommodated in the storage tank 42. Specifically, a lower end portion of the absorbent member 52 is accommodated in the storage tank 42. Therefore, when the supply unit 31 is in the supply state, the absorbent member 52 contacts the cleaning liquid stored in the storage tank 42. As a result, the absorbent member 52 is in a state of containing the cleaning liquid. When the supply unit 31 is in the non-supply state, the absorbent member 52 does not contact the cleaning liquid stored in the storage tank 42.

The cleaning roller 32 is switched between a contact state in which the cleaning roller 32 contacts the support surface 26 and a non-contact state in which the cleaning roller 32 is separated from the support surface 26, by the movement mechanism 27. When the cleaning roller 32 is in the contact state, the absorbent member 52 comes into contact with the support surface 26. In this embodiment, an upper end portion of the absorbent member 52 comes into contact with the support surface 26. When the cleaning roller 32 is in the non-contact state, the absorbent member 52 does not come into contact with the support surface 26.

When the supply unit 31 is in the supply state and the cleaning roller 32 is in the contact state, the cleaning roller 32 cleans the support surface 26 by rotating. In this embodiment, the cleaning roller 32 is rotated by the drive unit 34. The cleaning roller 32 may be driven and rotated by drive force of the drive unit 34, or may be driven to rotate while contacting the transport belt 22 by the drive force of the drive source 21. The absorbent member 52 wet with the cleaning liquid rotates and comes into contact with the support surface 26, so that dirt on the support surface 26 is removed.

In this embodiment, when cleaning the transport belt 22, the cleaning roller 32 rotates in the same direction as the circulation direction of the transport belt 22. That is, when cleaning the transport belt 22, the cleaning roller 32 rotates in the counterclockwise direction in FIGS. 2 and 3. In this embodiment, at a contact point of the cleaning roller 32, the cleaning roller 32 rotates such that the absorbent member 52 moves in the first direction A1, whereas the transport belt 22 moves in the second direction A2. As a result, contact resistance between the transport belt 22 and the cleaning roller 32 increases, so that dirt on the transport belt 22 can be easily removed.

When cleaning the transport belt 22, the cleaning roller 32 may be rotated by the drive unit 34 in a direction opposite to the circulation direction of the transport belt 22. That is, the cleaning roller 32 may rotate in a clockwise direction in FIGS. 2 and 3. In this case as well, the cleaning roller 32 can clean the transport belt 22.

The squeeze member 33 is a member that squeezes the absorbent member 52. The squeeze member 33 comes into contact with the absorbent member 52 so as to deform the absorbent member 52. The squeeze member 33 contacts the absorbent member 52 so as to sink therein. The squeeze member 33 squeezes the absorbent member 52 as the cleaning roller 32 rotates in a state where the squeeze member 33 contacts the absorbent member 52.

The squeeze member 33 squeezes the absorbent member 52 during the time from the absorbent member 52 is immersed in the storage tank 42 to the absorbent member 52 comes into contact with the support surface 26. Therefore, the absorbent member 52 that has absorbed the cleaning liquid in the storage tank 42 comes into contact with the support surface 26 after being squeezed by the squeeze member 33. By being squeezed, the amount of cleaning liquid contained in the absorbent member 52 is adjusted. That is, the cleaning roller 32 cleans the support surface 26 with the absorbent member 52 containing an appropriate amount of the cleaning liquid for cleaning the transport belt 22. As a result, the support surface 26 is prevented from wetting with the cleaning liquid more than necessary.

In this embodiment, the cleaning roller 32 rotates in the counterclockwise direction in FIGS. 2 and 3 when cleaning the transport belt 22, so that the squeeze member 33 is located in a position displaced in the second direction A2 with respect to the cleaning roller 32. When the cleaning roller 32 is rotated in the clockwise direction in FIGS. 2 and 3 when cleaning the transport belt 22, the squeeze member 33 is located in a position displaced in the first direction A1 with respect to the cleaning roller 32. That is, in the rotation direction of the cleaning roller 32, the squeeze member 33 is provided in at least a part of a region from the downstream side of a portion of the cleaning roller 32 that contacts the cleaning liquid to the upstream side of a portion of the cleaning roller 32 that contacts the support surface 26. As a result, the absorbent member 52 that has absorbed the cleaning liquid in the storage tank 42 comes into contact with the support surface 26 after being squeezed by the squeeze member 33.

In this embodiment, the squeeze member 33 is a roller. Therefore, when squeezing the absorbent member 52, the squeeze member 33 rotates together with the cleaning roller 32. The squeeze member 33 is not limited to the roller, but may be a clamp or a blade. The squeeze member 33 is required to deform the absorbent member 52 by contacting the absorbent member 52.

As the squeeze member 33 squeezes the absorbent member 52 while the supply unit 31 is in the supply state, the transport belt 22 is appropriately cleaned. As the squeeze member 33 squeezes the absorbent member 52 while the supply unit 31 is in the non-supply state, the amount of the cleaning liquid contained in the absorbent member 52 is reduced. As a result, the absorbent member 52 is easily dried. As a result, the absorbent member 52 is prevented from remaining wet with the cleaning liquid.

When the absorbent member 52 is left wet for a long time, the absorbent member 52 may deteriorate. For example, mold may grow on the absorbent member 52. Therefore, the squeeze member 33 promotes the drying of the absorbent member 52, so that possibility that the absorbent member 52 is deteriorated is reduced. For example, when it is expected that the transport device 15 will not be used for a long period of time, the squeeze member 33 may squeeze the absorbent member 52 to accelerate the drying of the absorbent member 52.

The drive unit 34 is configured to rotate the cleaning roller 32. The drive unit 34 is an example of the drive unit of the present invention. When the drive unit 34 rotates the cleaning roller 32, the absorbent member 52 is squeezed by the squeeze member 33. In this embodiment, the drive unit 34 is a motor coupled to the cleaning roller 32. Therefore, in this embodiment, the drive unit 34 drives and rotates the cleaning roller 32. The drive unit 34 may be configured such that the cleaning roller 32 is driven to rotate. That is, drive force for rotating the cleaning roller 32 may be transmitted to other elements instead of the cleaning roller 32. For example, the drive unit 34 may be a motor coupled to the squeeze member 33. In this case, the cleaning roller 32 is driven to rotate as the squeeze member 33 is rotated by the drive unit 34.

Alternatively, for example, drive force of the drive source 21 may be transmitted to the cleaning roller 32 via the transport belt 22. That is, the drive unit 34 may be omitted, and the drive force of the drive source 21 may be transmitted to the cleaning roller 32 via the transport belt 22. In this case, the drive source 21 is configured to rotate the cleaning roller 32. When the transport belt 22 is circulated by the drive source 21, the cleaning roller 32 is driven to rotate while contacting the support surface 26.

The spray unit 35 is coupled to a blower 54. In this embodiment, the blower 54 is a configuration outside the recording device 11. In other words, the blower 54 is coupled to the recording device 11 or the transport device 15. The blower 54 sends gas to the spray unit 35.

The spray unit 35 is configured to provide directivity to wind pressure (energy) of the gas sent from the blower 54. The spray unit 35 is, for example, an air knife. The spray unit 35 sprays the gas sent from the blower 54 onto the transport belt 22. Specifically, the spray unit 35 sprays the gas onto the support surface 26.

The spray unit 35 sprays gas onto the support surface 26 cleaned by the cleaning roller 32. That is, the spray unit 35 sprays gas onto the support surface 26 which the cleaning roller 32 has contacted. Specifically, the spray unit 35 sprays gas with respect to a specific region of the support surface 26 after being cleaned by the cleaning roller 32. As a result, the spray unit 35 dries the support surface 26 wet with the cleaning liquid. In this embodiment, the spray unit 35 is located at a position displaced in the second direction A2 with respect to the cleaning roller 32. Note that with regard to drying of the support surface 26 by the spray unit 35, residual moisture in the support surface 26 may not be completely zero.

The spray unit 35 is configured to spray gas onto the cleaning roller 32. The spray unit 35 is configured to spray gas not only on the support surface 26 but also on the absorbent member 52. In this embodiment, the spray unit 35 is configured such that a target to which the gas is sprayed can be switched to the support surface 26 or the cleaning roller 32.

In this embodiment, the spray unit 35 includes an inner drum 55 and an outer drum 56. The inner drum 55 and the outer drum 56 each have an outlet for blowing gas. The gas sent out by the blower 54 passes through the inner drum 55 and the outer drum 56 in this order.

The inner drum 55 is accommodated in the outer drum 56. The inner drum 55 is configured to rotate with respect to the outer drum 56. The inner drum 55 includes a first outlet 57 as the outlet. The outer drum 56 is fixed to the support tank 41. The outer drum 56 wet a second outlet 58 and a third outlet 59 as the outlets. The second outlet 58 and the third outlet 59 face different directions from each other. The second outlet 58 faces the support surface 26. The third outlet 59 faces the absorbent member 52.

The inner drum 55 is configured to be rotated by a switching mechanism (not illustrated). The switching mechanism (not illustrated) includes, for example, a switching drive unit that can be controlled by the control unit 13, and a transmission mechanism that transmits drive force of the switching drive unit to the inner drum 55. When a motor is employed as the switching drive unit, for example, one or both of a transmission belt and at least one gear is employed. As the inner drum 55 rotates, the first outlet 57 moves within the outer drum 56. When the first outlet 57 overlaps with the second outlet 58, the gas is sprayed onto the support surface 26. When the first outlet 57 overlaps with the third outlet 59, the gas is sprayed onto the absorbent member 52.

In this embodiment, the spray unit 35 is configured to selectively spray gas onto the support surface 26 or the absorbent member 52. As a result, under the condition where air flow rate per unit time of the gas from the blower 54 is substantially constant, the amount of gas sprayed per unit time increases as compared with a case where gas is simultaneously sprayed onto both the support surface 26 and the absorbent member 52. The spray unit 35 may be configured to simultaneously spray gas onto both the support surface 26 and the absorbent member 52. In this case, for example, the inner drum 55 may be removed from the spray unit 35. Alternatively, gas may be sprayed onto both the support surface 26 and the absorbent member 52 by, for example, obliquely arranging the spray unit 35 having only one outlet and spraying toward a contact point between the support surface 26 and the absorbent member 52.

The spray unit 35 sprays gas onto the absorbent member 52, so that the absorbent member 52 becomes easy to dry. As a result, the absorbent member 52 is prevented from remaining wet with the cleaning liquid. When the absorbent member 52 is left wet for a long time, the absorbent member 52 may deteriorate. For example, mold may grow on the absorbent member 52. In particular, mold is likely to grow on a portion of the absorbent member 52 that is in contact with the atmosphere. The spray unit 35 promotes the drying of the absorbent member 52, so that possibility that the absorbent member 52 is deteriorated is reduced. For example, when it is expected that the transport device 15 will not be used for a long period of time, the spray unit 35 may spray gas to the absorbent member 52 to accelerate the drying of the absorbent member 52.

The cleaning mechanism 23 may include a heating unit 61. In other words, the recording device 11 or the transport device 15 may include the heating unit 61. The heating unit 61 is configured to heat the gas to be sprayed by the spray unit 35. The heating unit 61 includes, for example, a heating element. The heating unit 61 is attached to the inner drum 55, for example. The heating unit 61 may be attached to the outer drum 56. The heating unit 61 is not limited to being attached to the inner drum 55 or the outer drum 56 and may be provided between the spray unit 35 and the cleaning roller 32. As the heating unit 61 heats the gas to be sprayed by the spray unit 35, the heated gas is sprayed onto the absorbent member 52. This further promotes the drying of the absorbent member 52. The heating unit 61 may heat the gas to be sprayed on the support surface 26. Note that, the heating unit 61 may be controlled by the control unit 13. For example, the control unit 13 may control temperature of the gas based on drying condition of the absorbent member 52.

The cleaning mechanism 23 may include a detection unit 62. In other words, the recording device 11 or the transport device 15 may include the detection unit 62. The detection unit 62 is configured to detect the amount of the cleaning liquid contained in the absorbent member 52. The detection unit 62 is located at a position in contact with the absorbent member 52, that is, a position in contact with a surface of the absorbent member 52. The detection unit 62 detects the amount of the cleaning liquid contained in the absorbent member 52, for example, by measuring an electric resistance value on the surface of the absorbent member 52. The detection unit 62 transmits the detection result to the control unit 13.

In this embodiment, the detection unit 62 contacts a portion of the absorbent member 52 after being squeezed by the squeeze member 33. Therefore, the detection unit 62 detects the amount of the cleaning liquid contained in the portion of the absorbent member 52 that has been squeezed by the squeeze member 33. The detection unit 62 and the squeeze member 33 are located so as to sandwich the rotary shaft 51, for example. That is, the detection unit 62 is located at a position displaced in the first direction A1 with respect to the cleaning roller 32.

When the supply unit 31 is in the supply state, the control unit 13 can recognize supply condition of the cleaning liquid to the absorbent member 52 based on the detection result of the detection unit 62. That is, the control unit 13 can recognize whether an appropriate amount of cleaning liquid is supplied to the absorbent member 52 for cleaning the transport belt 22. For example, the control unit 13 controls the supply amount of the cleaning liquid based on the detection result of the detection unit 62. When cleaning the transport belt 22, if the amount of cleaning liquid contained in the absorbent member 52 is large, the control unit 13 reduces liquid level of the cleaning liquid stored in the storage tank 42. As a result, the amount of the cleaning liquid supplied to the absorbent member 52 is reduced. When cleaning the transport belt 22, if the amount of cleaning liquid contained in the absorbent member 52 is small, the control unit 13 increases liquid level of the cleaning liquid stored in the storage tank 42. As a result, the amount of the cleaning liquid supplied to the absorbent member 52 is increased.

When the supply unit 31 is in the non-supply state, the control unit 13 can recognize drying condition of the absorbent member 52 based on the detection result of the detection unit 62. For example, the control unit 13 controls a drying process of promoting the drying of the absorbent member 52 by the spray unit 35, the squeeze member 33, or both of them, based on the detection result of the detection unit 62. As a result, the drying condition of the absorbent member 52 is controlled. In this embodiment, the drying condition of the absorbent member 52 can be controlled based, not only on the detection result of the detection unit 62, but also on duration in which the drying process is continued.

The cleaning mechanism 23 may include a brush roller 63. The brush roller 63 cleans the support surface 26 by coming into contact with the support surface 26. The brush roller 63 is rotatably supported by the support tank 41. In this embodiment, when the cleaning roller 32 is in the contact state, the brush roller 63 comes into contact with the support surface 26. When the cleaning roller 32 is in the non-contact state, the brush roller 63 separates from the support surface 26.

The brush roller 63 is arranged parallel to the cleaning roller 32. In this embodiment, the brush roller 63 is located at a position displaced in the first direction A1 from the cleaning roller 32. Therefore, the brush roller 63 comes into contact with a specific region of the support surface 26 before the cleaning roller 32 comes into contact with the specific region.

The brush roller 63 includes a rotary shaft 64 and a brush 65. The rotary shaft 64 is parallel to the rotary shaft 51. The brush 65 extends radially from the rotary shaft 64 when viewed from an axial direction of the rotary shaft 64. The brush 65 is supported by the rotary shaft 64. The brush 65 rotates with the rotary shaft 64.

In this embodiment, a portion of the brush 65 is accommodated in the storage tank 42. Specifically, a lower end portion of the brush 65 is accommodated in the storage tank 42. Therefore, depending on the liquid level of the cleaning liquid stored in the storage tank 42, the brush 65 comes into contact with the cleaning liquid stored in the storage tank 42. That is, the cleaning liquid is supplied to the brush 65. In this embodiment, when the supply unit 31 is in the supply state, the brush 65 contacts the cleaning liquid stored in the storage tank 42. When the supply unit 31 is in the non-supply state, the brush 65 does not contact the cleaning liquid stored in the storage tank 42. That is, in this embodiment, the supply state is a state in which the cleaning liquid is supplied to the cleaning roller 32 and the brush roller 63 from the supply unit 31. The non-supply state is a state in which the cleaning liquid is not supplied to the cleaning roller 32 and the brush roller 63 from the supply unit 31.

The brush roller 63 cleans the support surface 26 by rotating while the supply unit 31 is in the supply state. In this embodiment, the brush roller 63 is interlocked with, for example, the rotation of the cleaning roller 32. The brush roller 63 may be driven to rotate by the drive unit 34. The brush roller 63 may not be interlocked with the cleaning roller 32 and may be driven to rotate by the circulation of the transport belt 22. The brush 65 wet with the cleaning liquid comes into contact with the support surface 26 while rotating, thereby dirt on the support surface 26 is removed.

In this embodiment, a rotation direction of the brush roller 63 coincides with the rotation direction of the cleaning roller 32. The rotation direction of the brush roller 63 may be different from the rotation direction of the cleaning roller 32. In this embodiment, the brush roller 63 rotates in the counterclockwise direction in FIGS. 2 and 3. As a result, contact resistance between the transport belt 22 and the brush roller 63 increases, so that dirt on the transport belt 22 can be easily removed.

Next, the drying process that promotes drying of the absorbent member 52 will be described.

The control unit 13 performs the drying process of promoting drying of the absorbent member 52 by one of the spray unit 35 and the squeeze member 33, or both of them. The control unit 13 starts the drying process at a predetermined time. The control unit 13 starts, for example, a first drying process in which gas is sprayed from the spray unit 35 onto the cleaning roller 32, at a predetermined time. The control unit 13 starts, for example, a second drying process in which the squeeze member 33 squeezes the absorbent member 52 while the supply unit 31 is in the non-supply state, at a predetermined time. The control unit 13 starts, for example, a third drying process in which gas is sprayed from the spray unit 35 onto the cleaning roller 32 and the squeeze member 33 squeezes the absorbent member 52 while the supply unit 31 is in the non-supply state, at a predetermined time. The control unit 13 may select a process to be performed from the first drying process, the second drying process, and the third drying process.

The predetermined time is, for example, when the power of the recording device 11 or the transport device 15 is turned off, when the reception unit 14 receives an instruction from the user to start the drying process, when a preset time is reached, and the like.

The control unit 13 terminates the drying process based on a predetermined condition. The control unit 13 terminates, for example, the first drying process in which gas is sprayed from the spray unit 35 onto the cleaning roller 32, based on a predetermined condition. The control unit 13 terminates, for example, the second drying process in which the squeeze member 33 squeezes the absorbent member 52 while the supply unit 31 is in the non-supply state, based on a predetermined condition. The control unit 13 terminates, for example, the third drying process in which gas is sprayed from the spray unit 35 onto the cleaning roller 32 and the squeeze member 33 squeezes the absorbent member 52 while the supply unit 31 is in the non-supply state, based on a predetermined condition.

The predetermined condition is, for example, a condition based on the detection result of the detection unit 62, a condition based on duration of the drying process, and the like. The control unit 13 terminates the drying process when the predetermined condition is satisfied. Therefore, the control unit 13 terminates the drying process based on the detection result of the detection unit 62 and the duration of the drying process. The duration can be arbitrarily set by the user, for example, using the reception unit 14. The duration may be set to an appropriate value, for example, based on evaluation results of experiments and simulations performed in advance. The control unit 13 may terminate the drying process under the predetermined conditions, for example, such as when the reception unit 14 receives an instruction from the user to end the drying process, and when a preset time is reached.

First, the first drying process will be described. When the control unit 13 receives, for example, a start instruction to start spraying gas from the spray unit 35 to the cleaning roller 32, that is, an instruction to start the first drying process from the user through the reception unit 14, the control unit 13 starts the first drying process illustrated in FIG. 4.

Figure 4:
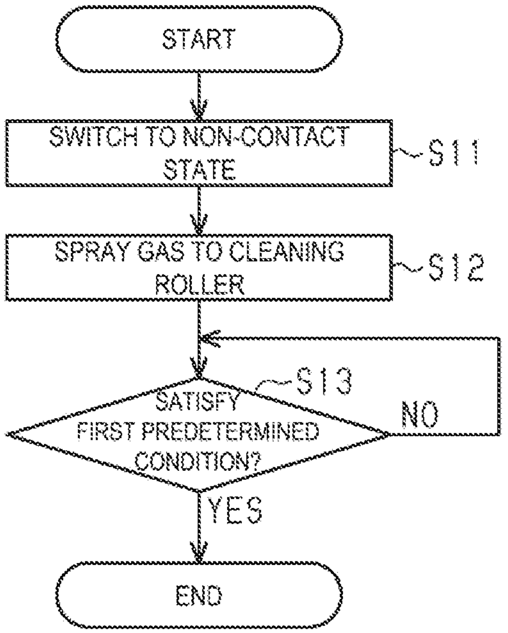
FIG. 4 is a flowchart illustrating a drying process by a spray unit.

As illustrated in FIG. 4, the control unit 13 switches the state of the cleaning roller 32 from the contact state to the non-contact state in step S11. When the state of the cleaning roller 32 is in the non-contact state at the time of performing step S11, the state of the cleaning roller 32 is maintained in the non-contact state. The control unit 13 causes the moving mechanism 27 to separate the cleaning roller 32 from the support surface 26. At this time, the control unit 13 may switch the state of the supply unit 31 from the supply state to the non-supply state.

In step S12, the control unit 13 causes the spray unit 35 to spray gas to the cleaning roller 32. The control unit 13 overlaps the first outlet 57 with the third outlet 59 by rotating the inner drum 55. As a result, gas is sprayed onto the cleaning roller 32. At this time, since the cleaning roller 32 is separated from the support surface 26, the gas easily flows on the peripheral surface of the cleaning roller 32. Therefore, the drying of the absorbent member 52 is easily promoted. As described above, the spray unit 35 of this embodiment sprays the gas onto the cleaning roller 32 in a state where the cleaning roller 32 is separated from the support surface 26.

Even when the spray unit 35 sprays gas onto the cleaning roller 32 that is in the contact state, the drying of the absorbent member 52 can be promoted. Accordingly, in the first drying process, step S11 may be skipped. Further, in the first drying process, step S11 and step S12 may be performed at the same time.

When the supply unit 31 is in the non-supply state, as the spray unit 35 sprays gas on the cleaning roller 32, the drying of the entire absorbent member 52 is promoted. When the supply unit 31 is in the supply state, the drying of a portion of the absorbent member 52 that is not immersed in the cleaning liquid is promoted. A portion of the absorbent member 52 that is immersed in the cleaning liquid does not easily touch the atmosphere and therefore does not easily deteriorate.

In step S13, the control unit 13 determines whether or not a first predetermined condition is satisfied. The first predetermined condition is a condition for terminating the first drying process. The first predetermined condition may be a condition based on duration of the first drying process, or may be a condition based on the amount of the cleaning liquid detected by the detection unit 62. The control unit 13 may determine that the first predetermined condition is satisfied, for example, when elapsed time elapsed from the start of spraying the gas from the spray unit 35 to the cleaning roller 32 reaches the duration. That is, the control unit 13 may determine that the first predetermined condition is satisfied when elapsed time elapsed from the start of step S12 reaches the duration. In this case, the control unit 13 counts time when the step S12 is performed. The control unit 13 may count the time elapsed from the time when step S11 is performed as the elapsed time. The control unit 13 may determine that the first predetermined condition is satisfied, for example, when the amount of the cleaning liquid detected by the detection unit 62 is equal to or less than a threshold value. In this case, the threshold value is stored in the control unit 13. The threshold value is set to an appropriate value based on, for example, evaluation results of experiments and simulations performed in advance.

When the control unit 13 determines that the first predetermined condition is satisfied in step S13, the control unit 13 terminates the first drying process. At this time, the control unit 13 ends operation of spraying gas from the spray unit 35 to the cleaning roller 32. The control unit 13 may rotate the inner drum 55 such that the first outlet 57 overlaps the second outlet 58, and may rotate the inner drum 55 such that the first outlet 57 does not overlap with any of the second outlet 58 and the third outlet 59.

When the control unit 13 determines in step S13 that the first predetermined condition is not satisfied, the control unit 13 repeats step S13. That is, gas is continuously sprayed to the cleaning roller 32 by the spray unit 35 until the first predetermined condition is satisfied. The first predetermined condition may include the condition based on the duration and the condition based on the detection result of the detection unit 62. In this case, the control unit 13 terminates the first drying process when the elapsed time reaches the duration and the amount of the cleaning liquid detected by the detection unit 62 is equal to or less than the threshold value. When the amount of the cleaning liquid detected by the detection unit 62 does not fall below the threshold value even though the elapsed time has reached the duration, the control unit 13 may notify an error.

Next, the second drying process will be described. When the control unit 13 receives, for example, a start instruction to start squeezing the absorbent member 52 by the squeeze member 33 while the supply unit 31 is in the non-supply state, that is, an instruction to start the second drying process from the user through the reception unit 14, the control unit 13 starts the second drying process illustrated in FIG. 5. The start instruction and duration are examples of instructions regarding operation of the squeeze member 33 squeezing the absorbent member 52. The instruction regarding operation of the squeeze member 33 squeezing the absorbent member 52 may be, for example, a value of pressure when the squeeze member 33 presses the absorbent member 52 or a value of rotation speed of the cleaning roller 32. The control unit 13 may control the operation of the squeeze member 33 to squeeze the absorbent member 52 based on the instruction. For example, the control unit 13 may control the pressure, the rotation speed, and the like based on the instruction.

Figure 5:
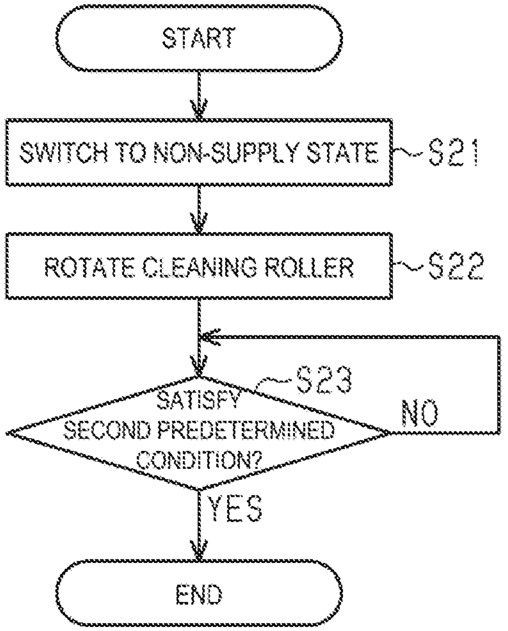
FIG. 5 is a flowchart illustrating a drying process by a squeeze member.

As illustrated in FIG. 5, the control unit 13 switches the state of the supply unit 31 from the supply state to the non-supply state in step S21. When the state of the supply unit 31 is in the non-supply state at the time of performing step S21, the state of the supply unit 31 is maintained in the non-supply state. The control unit 13 switches the state of the supply unit 31 from the supply state to the non-supply state by closing the supply valve 44 and opening the discharge valve 46. At this time, the control unit 13 may switch the state of the cleaning roller 32 from the contact state to the non-contact state. However, in a case of the configuration in which drive force of the drive source 21 is transmitted to the cleaning roller 32 via the transport belt 22, the control unit 13 switches the state of the cleaning roller 32 from the non-contact state to the contact state, or maintains the contact state. This is because when the cleaning roller 32 is in the non-contact state, the cleaning roller 32 cannot be driven to rotate by the drive source 21.

The control unit 13 causes the cleaning roller 32 to rotate by controlling the drive unit 34 in step S22. As a result, the cleaning roller 32 is squeezed by the squeeze member 33. Note that in the second drying process, step S21 and step S22 may be performed at the same time.

When the cleaning roller 32 is in the non-contact state in step S21, the squeeze member 33 squeezes the absorbent member 52 in a state where the cleaning roller 32 is separated from the support surface 26, in the step S22. In this case, rotational resistance applied to the cleaning roller 32 is reduced as compared with a case where the cleaning roller 32 is in the contact state. Therefore, it becomes easy to squeeze the absorbent member 52.

In step S23, the control unit 13 determines whether or not a second predetermined condition is satisfied. The second predetermined condition is a condition for terminating the second drying process. The second predetermined condition may be a condition based on duration of the second drying process, or may be a condition based on the amount of the cleaning liquid detected by the detection unit 62. The control unit 13 may determine that the second predetermined condition is satisfied, for example, when elapsed time elapsed from the time when the squeeze member 33 starts to squeeze the absorbent member 52 reaches the duration. That is, the control unit 13 may determine that the second predetermined condition is satisfied when elapsed time elapsed from the start of step S22 reaches the duration. In this case, the control unit 13 counts time when the step S22 is performed. The control unit 13 may count the time elapsed from the time when step S21 is performed as the elapsed time. The control unit 13 may determine that the second predetermined condition is satisfied, for example, when the amount of the cleaning liquid detected by the detection unit 62 is equal to or less than a threshold value.

When the control unit 13 determines that the second predetermined condition is satisfied in step S23, the control unit 13 terminates the second drying process. At this time, the control unit 13 ends operation of the squeeze member 33 squeezing the absorbent member 52. The control unit 13 stops the cleaning roller 32 by controlling the drive unit 34.

When the control unit 13 determines in step S23 that the second predetermined condition is not satisfied, the control unit 13 repeats step S23. That is, the control unit 13 continues to squeeze the absorbent member 52 until the second predetermined condition is satisfied. Similar to the first predetermined condition, the second predetermined condition may include the condition based on the duration and the condition based on the detection result of the detection unit 62. The second predetermined condition may be the same condition as or a different condition from the first predetermined condition.

The first drying process and the second drying process may be performed in parallel. When performed in parallel, times to be started may be simultaneous or may be different. The first drying process and the second drying process are started at each predetermined time and ended at each predetermined condition.

Next, the third drying process will be described. When the control unit 13 receives, for example, a start instruction to start both spraying gas on the cleaning roller 32 by the spray unit 35 and squeezing the absorbent member 52 by the squeeze member 33 while the supply unit 31 is in the non-supply state, that is, an instruction to start the third drying process from the user through the reception unit 14, the control unit 13 starts the third drying process illustrated in FIG. 6. That is, the third drying process is a process in which the first drying process and the second drying process are combined. The start instruction and duration are examples of instructions regarding operation of the squeeze member 33 squeezing the absorbent member 52. The instruction regarding the operation of the squeeze member 33 squeezing the absorbent member 52 may be, for example, a value of pressure when the squeeze member 33 presses the absorbent member 52 or a value of rotation speed of the cleaning roller 32. The control unit 13 may control the operation of the squeeze member 33 to squeeze the absorbent member 52 based on the instruction. For example, the control unit 13 may control the pressure, the rotation speed, and the like based on the instruction.

Figure 6:
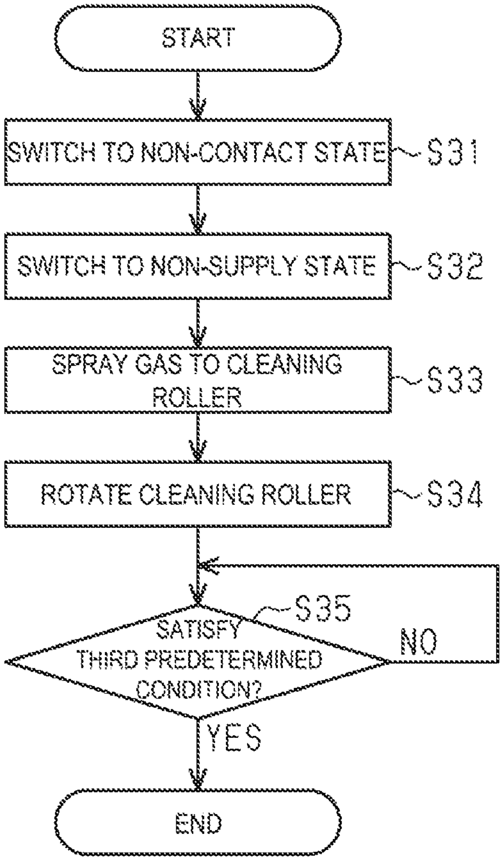
FIG. 6 is a flowchart illustrating a drying process by the spray unit and the squeeze member.

As illustrated in FIG. 6, in step S31, the control unit 13 switches the state of the cleaning roller 32 from the contact state to the non-contact state in the same manner as in step S11. When the state of the cleaning roller 32 is in the non-contact state at the time of performing step S31, the state of the cleaning roller 32 is maintained in the non-contact state.

In step S32, the control unit 13 switches the state of the supply unit 31 from the supply state to the non-supply state in the same manner as in step S21. When the state of the supply unit 31 is in the non-supply state at the time of performing step S32, the state of the supply unit 31 is maintained in the non-supply state. The order of step S31 and step S32 may be reversed. Step S31 and step S32 may be performed at the same time.

In step S33, the control unit 13 causes the spray unit 35 to spray gas to the cleaning roller 32 in the same manner as in step S12.

In step S34, the control unit 13 causes the cleaning roller 32 to rotate in the same manner as in step S22. The order of step S33 and step S34 may be reversed. Step S33 and step S34 may be performed at the same time. Step S31 to step S34 may be performed at the same time.

In step S35, the control unit 13 determines whether or not a third predetermined condition is satisfied. The third predetermined condition is a condition for terminating the third drying process. The third predetermined condition may be a condition based on duration of the third drying process, or may be a condition based on the amount of the cleaning liquid detected by the detection unit 62. The control unit 13 may determine that the third predetermined condition is satisfied, for example, when elapsed time elapsed from the start of spraying the gas from the spray unit 35 to the cleaning roller 32 and of squeezing of the absorbent member 52 by the squeeze member 33 reaches the duration. That is, the control unit 13 may determine that the third predetermined condition is satisfied when elapsed time elapsed from the time when both step S33 and step S34 are performed reaches the duration. The control unit 13 may determine that the third predetermined condition is satisfied, for example, when the amount of the cleaning liquid detected by the detection unit 62 is equal to or less than a threshold value.

When the control unit 13 determines that the third predetermined condition is satisfied in step S35, the control unit 13 terminates the third drying process. At this time, the control unit 13 ends operation of the spray unit 35 spraying gas to the cleaning roller 32 and operation of the squeeze member 33 squeezing the absorbent member 52. The control unit 13 stops the cleaning roller 32 while rotating the inner drum 55 such that the first outlet 57 does not overlap the third outlet 59.

When the control unit 13 determines in step S35 that the third predetermined condition is not satisfied, the control unit 13 repeats step S35. That is, the control unit 13 continues spraying the gas to the cleaning roller 32 by the spray unit 35 and squeezing the absorbent member 52 by the squeeze member 33. Similar to the first predetermined condition and the second predetermined condition, the third predetermined condition may include the condition based on the duration and the condition based on the detection result of the detection unit 62. The third predetermined condition may be the same condition as the first predetermined condition, may be the same condition as the second predetermined condition, or may be a different condition from the first predetermined condition and the second predetermined condition.

Next, the functions and effects of the exemplary embodiment described above will be described.

(1) The transport device 15 includes the squeeze member 33 configured to contact the absorbent member 52 and to squeeze the absorbent member 52 as the cleaning roller 32 rotates in a state in which the squeeze member 33 contacts the absorbent member 52. The squeeze member 33 squeezes the absorbent member 52 while the supply unit 31 is in the non-supply state.

According to the above-described configuration, as the squeeze member 33 squeezes the absorbent member 52 while the supply unit 31 is in the non-supply state, the amount of the cleaning liquid contained in the absorbent member 52 is reduced. This makes it easier to dry the cleaning roller 32.

Accordingly, the cleaning roller 32 is prevented from remaining wet. That is, deterioration of the cleaning roller 32 is prevented.

(2) The squeeze member 33 squeezes the absorbent member 52 in a state in which the cleaning roller 32 is separated from the support surface 26.

According to the above-described configuration, rotational resistance applied to the cleaning roller 32 is reduced as compared with a configuration where the absorbent member 52 is squeezed while the cleaning roller 32 contacts the support surface 26.

(3) After the squeeze member 33 starts squeezing the absorbent member 52 while the supply unit 31 is in the non-supply state, the control unit 13 terminates operation of the squeeze member 33 squeezing the absorbent member 52, based on a predetermined condition.

According to the above-described configuration, since the squeeze of the absorbent member 52 is terminated based on the predetermined condition, the absorbent member 52 is prevented from being squeezed more than necessary. When the absorbent member 52 is squeezed more than necessary, deterioration of the absorbent member 52 is accelerated.

(4) The control unit 13 terminates the operation of the squeeze member 33 squeezing the absorbent member 52 when the amount of the cleaning liquid detected by the detection unit 62 is equal to or less than a threshold value.

According to the above-described configuration, since the squeeze of the absorbent member 52 is terminated based on the amount of the cleaning liquid contained in the absorbent member 52, the absorbent member 52 is prevented from being squeezed more than necessary.

(5) The control unit 13 controls the operation of the squeeze member 33 squeezing the absorbent member 52 based on the instruction regarding the operation of the squeeze member 33 squeezing the absorbent member 52.

According to the above-described configuration, since the operation of the squeeze member 33 squeezing the absorbent member 52 can be controlled based on the instruction from the user, appropriate squeezing operation is performed according to the user.

(6) The control unit 13 terminates the operation of the squeeze member 33 squeezing the absorbent member 52 when elapsed time elapsed from the time when the squeeze member 33 starts to squeeze the absorbent member 52 reaches the duration.

According to the above-described configuration, the absorbent member 52 is squeezed for the duration set by the user. Therefore, convenience for the user is improved.

(7) The transport device 15 includes the spray unit 35 configured to spray gas to the cleaning roller 32.

According to the above-described configuration, the spray unit 35 sprays gas onto the cleaning roller 32, so that the cleaning roller 32 becomes easy to dry. Accordingly, the cleaning roller 32 is prevented from remaining wet with the cleaning liquid. That is, deterioration of the cleaning roller 32 is prevented.

(8) The transport device 15 includes the heating unit 61 configured to heat the gas to be sprayed by the spray unit 35.

According to the above-described configuration, the heated gas is sprayed onto the cleaning roller 32. As a result, the cleaning roller 32 is easily dried.

The present embodiment may be modified as follows. The present embodiment and modified examples thereof to be described below may be implemented in combination within a range in which a technical contradiction does not arise.

The supply unit 31 may be configured to supply the cleaning liquid to the cleaning roller 32 by spraying or dropping the cleaning liquid toward the cleaning roller 32. In this case, the supply unit 31 includes a cleaning liquid nozzle that sprays or drops the cleaning liquid. A state in which the cleaning liquid is sprayed or dropped from the cleaning liquid nozzle is the supply state. A state in which spraying or dropping of the cleaning liquid from the cleaning liquid nozzle is stopped is the non-supply state.

The spray unit 35 may be configured to switch a target to which the gas is sprayed to the support surface 26 or the cleaning roller 32, for example, by a shutter, a valve, or the like.

The blower 54 may be included in the recording device 11 or the transport device 15. That is, the blower 54 may be controlled by the control unit 13. The control unit 13 may control the amount of gas sent by the blower 54, turning on and off the blower 54, and the like.

The spray unit 35 is not limited to the configuration spraying gas onto the support surface 26 and the cleaning roller 32, and may be configured to spray gas only onto the cleaning roller 32.

The liquid discharged by the recording unit 12 is not limited to ink, and may be, for example, a liquid material including particles of a functional material dispersed or mixed in liquid. For example, the recording unit 12 may discharge a liquid material including a material such as an electrode material or a pixel material used in manufacture of a liquid crystal display, an electroluminescent (EL) display, and a surface emitting display in a dispersed or dissolved form.

Hereinafter, technical concepts and effects thereof that are understood from the above-described exemplary embodiments and modified examples will be described.

(A) A transport device includes a transport belt having a support surface configured to support a medium, and configured to transport the medium supported by the support surface, a cleaning roller including an absorbent member configured to absorb cleaning liquid, and configured to clean the support surface as the absorbent member comes into contact with the support surface, a supply unit configured to supply the cleaning liquid to the cleaning roller, a drive unit configured to rotate the cleaning roller, and a squeeze member configured to contact the absorbent member and to squeeze the absorbent member as the cleaning roller rotates in a state in which the squeeze member is in contact with the absorbent member, the supply unit is configured to be switched between a supply state in which the cleaning liquid is supplied to the cleaning roller and a non-supply state in which the cleaning liquid is not supplied to the cleaning roller, and the squeeze member squeezes the absorbent member while the supply unit is in the non-supply state.

According to the above-described configuration, as the squeeze member squeezes the absorbent member while the supply unit is in the non-supply state, the amount of the cleaning liquid contained in the absorbent member is reduced. This makes it easier to dry the cleaning roller. Accordingly, the cleaning roller is prevented from remaining wet. That is, deterioration of the cleaning roller is prevented.

(B) The transport device may include a movement mechanism configured to relatively move the transport belt and the cleaning roller such that the cleaning roller is separated from the support surface, and the squeeze member may squeeze the absorbent member in a state in which the cleaning roller is separated from the support surface.

According to the above-described configuration, rotational resistance applied to the cleaning roller is reduced as compared with a configuration where the absorbent member is squeezed while the cleaning roller contacts the support surface.

(C) The transport device may include a control unit, and after the squeeze member starts squeezing the absorbent member while the supply unit is in the non-supply state, the control unit may terminate operation of the squeeze member squeezing the absorbent member, based on a predetermined condition.

According to the above-described configuration, since the squeeze of the absorbent member is terminated based on the predetermined condition, the absorbent member is prevented from being squeezed more than necessary.

(D) The transport device may include a detection unit configured to detect an amount of the cleaning liquid contained in the absorbent member, and the predetermined condition may include a condition based on the amount of the cleaning liquid detected by the detection unit, and the control unit may terminate the operation of the squeeze member squeezing the absorbent member when the amount of the cleaning liquid detected by the detection unit is equal to or less than a threshold value.

According to the above-described configuration, since the squeeze of the absorbent member is terminated based on the amount of the cleaning liquid contained in the absorbent member, the absorbent member is prevented from being squeezed more than necessary.

(E) The transport device may include a reception unit configured to receive from a user an instruction regarding the operation of the squeeze member squeezing the absorbent member, and the control unit may control the operation of the squeeze member squeezing the absorbent member based on the instruction.

According to the above-described configuration, since the operation of the squeeze member squeezing the absorbent member can be controlled based on the instruction from the user, appropriate squeezing operation is performed according to the user.

(F) In the transport device, the reception unit may receive, as the instruction, duration in which the squeeze member continues to squeeze the absorbent member from a user, the predetermined condition may include a condition based on the duration, and the control unit may terminate the operation of the squeeze member squeezing the absorbent member when elapsed time elapsed from the time when the squeeze member starts to squeeze the absorbent member reaches the duration.

According to the above-described configuration, the absorbent member is squeezed for the duration set by the user. Therefore, convenience for the user is improved.

(G) The transport device may include a spray unit configured to spray gas to the cleaning roller.

According to the above-described configuration, the spray unit sprays gas onto the cleaning roller, so that the cleaning roller becomes easy to dry. Accordingly, the cleaning roller is prevented from remaining wet with the cleaning liquid. That is, deterioration of the cleaning roller is prevented.

(H) The transport device may include a heating unit configured to heat the gas to be sprayed by the spray unit.

According to the above-described configuration, the heated gas is sprayed onto the cleaning roller. As a result, the cleaning roller is easily dried.

(I) A recording device includes a recording unit configured to perform recording on a medium, a transport belt having a support surface configured to support the medium, and configured to transport the medium supported by the support surface, a cleaning roller including an absorbent member configured to absorb cleaning liquid, and configured to clean the support surface as the absorbent member comes into contact with the support surface, a supply unit configured to supply the cleaning liquid to the cleaning roller, a drive unit configured to rotate the cleaning roller, and a squeeze member configured to contact the absorbent member and to squeeze the absorbent member as the cleaning roller rotates in a state in which the squeeze member is in contact with the absorbent member, the supply unit is configured to be switched between a supply state in which the cleaning liquid is supplied to the cleaning roller and a non-supply state in which the cleaning liquid is not supplied to the cleaning roller, and the squeeze member squeezes the absorbent member when the supply unit is in the non-supply state.

According to the above-described configuration, an effect similar to that of the transport device described above can be obtained.

What is claimed is:

1. A transport device comprising:

a transport belt having a support surface configured to support a medium, and configured to transport the medium supported by the support surface, a cleaning roller including an absorbent member configured to absorb cleaning liquid first and then to clean the support surface with the cleaning liquid absorbed by the absorbent member as the absorbent member comes into contact with the support surface, a supply unit configured to directly supply the cleaning liquid to the cleaning roller by moving so that the cleaning liquid is brought into contact with the cleaning roller, a drive unit configured to rotate the cleaning roller, a squeeze member configured to contact the absorbent member and to squeeze the absorbent member as the cleaning roller rotates in a state in which the squeeze member is in contact with the absorbent member;

a control unit; and a detection unit configured to detect an amount of the cleaning liquid contained in the absorbent member, wherein the supply unit is configured to be switched between a supply state in which the cleaning liquid is supplied to the cleaning roller and a non-supply state in which the cleaning liquid is not supplied to the cleaning roller, the squeeze member squeezes the absorbent member while the supply unit is in the non-supply state, after the squeeze member starts squeezing the absorbent member while the supply unit is in the non-supply state, the control unit terminates operation of the squeeze member squeezing the absorbent member, based on a predetermined condition, the predetermined condition includes a condition based on the amount of the cleaning liquid detected by the detection unit, and the control unit terminates the operation of the squeeze member squeezing the absorbent member when the amount of the cleaning liquid detected by the detection unit is equal to or less than a threshold value.

2. The transport device according to claim 1, comprising:

a movement mechanism configured to relatively move the transport belt and the cleaning roller such that the cleaning roller is separated from the support surface, wherein the squeeze member squeezes the absorbent member in a state in which the cleaning roller is separated from the support surface.

3. The transport device according to claim 1, comprising:

a reception unit configured to receive from a user an instruction regarding the operation of the squeeze member squeezing the absorbent member, wherein the control unit controls the operation of the squeeze member squeezing the absorbent member based on the instruction.

4. The transport device according to claim 3, wherein the reception unit receives, as the instruction, duration in which the squeeze member continues to squeeze the absorbent member from a user, the predetermined condition includes a condition based on the duration, and the control unit terminates the operation of the squeeze member squeezing the absorbent member when elapsed time elapsed from the time when the squeeze member starts to squeeze the absorbent member reaches the duration.

5. The transport device according to claim 1, comprising:

a spray unit configured to spray gas to the cleaning roller.

6. The transport device according to claim 5, comprising:

a heating unit configured to heat the gas to be sprayed by the spray unit.

7. A recording device comprising:

a recording unit configured to perform recording on a medium, a transport belt having a support surface configured to support the medium, and configured to transport the medium supported by the support surface, a cleaning roller including an absorbent member configured to absorb cleaning liquid first and then to clean the support surface with the cleaning liquid absorbed by the absorbent member as the absorbent member comes into contact with the support surface, a supply unit configured to directly supply the cleaning liquid to the cleaning roller by moving so that the cleaning liquid is brought into contact with the cleaning roller, a drive unit configured to rotate the cleaning roller, a squeeze member configured to contact the absorbent member and to squeeze the absorbent member as the cleaning roller rotates in a state in which the squeeze member is in contact with the absorbent member;

a control unit; and a detection unit configured to detect an amount of the cleaning liquid contained in the absorbent member, wherein the supply unit is configured to be switched between a supply state in which the cleaning liquid is supplied to the cleaning roller and a non-supply state in which the cleaning liquid is not supplied to the cleaning roller, the squeeze member squeezes the absorbent member when the supply unit is in the non-supply state, after the squeeze member starts squeezing the absorbent member while the supply unit is in the non-supply state, the control unit terminates operation of the squeeze member squeezing the absorbent member, based on a predetermined condition, the predetermined condition includes a condition based on the amount of the cleaning liquid detected by the detection unit, and the control unit terminates the operation of the squeeze member squeezing the absorbent member when the amount of the cleaning liquid detected by the detection unit is equal to or less than a threshold value.

* * * * *